(12) United States Patent
Stanberry et al.

(10) Patent No.: US 6,647,121 B2
(45) Date of Patent: Nov. 11, 2003

(54) MOTORCYCLE AUDIO SYSTEM

(76) Inventors: Thomas M. Stanberry, 550 Linden, Shreveport, LA (US) 71104; Russell K. Garner, P.O. Box 178, Frierson, LA (US) 71027; James E. Burian, P.O. Box 78262, Shreveport, LA (US) 71137

( * ) Notice: Subject to any disclaimer, the term of this patent is extended or adjusted under 35 U.S.C. 154(b) by 0 days.

(21) Appl. No.: 10/093,895

(22) Filed: Mar. 8, 2002

(65) Prior Publication Data

US 2002/0131606 A1 Sep. 19, 2002

Related U.S. Application Data

(60) Provisional application No. 60/275,119, filed on Mar. 13, 2001.

(51) Int. Cl.$^7$ ................................................ H04B 1/00
(52) U.S. Cl. ...................................................... 381/86
(58) Field of Search ........................... 381/86; 455/345; 296/96.21; 280/288.4; 224/413

(56) References Cited

U.S. PATENT DOCUMENTS

| | | | |
|---|---|---|---|
| 4,066,196 A | 1/1978 | Jackson et al. | 224/30 |
| 4,280,226 A | 7/1981 | Jenkins | 455/345 |
| 4,379,584 A | * 4/1983 | Willey | 296/78.1 |
| 4,445,228 A | 4/1984 | Bruni | 381/24 |
| 4,473,251 A | 9/1984 | Murayama | 296/78.1 |
| 4,600,208 A | 7/1986 | Morislma | 280/289 A |
| 5,001,779 A | 3/1991 | Egcert et al. | 455/346 |
| 5,159,712 A | 10/1992 | Schneider et al. | 455/344 |
| 5,222,752 A | 6/1993 | Hewitt | 280/288.4 |
| 5,732,965 A | 3/1998 | Willey | 280/288.4 |
| 5,881,936 A | 3/1999 | Li | 224/413 |
| 6,254,166 B1 | * 7/2001 | Willey | 296/78.1 |
| 6,483,438 B2 | * 11/2002 | DeLine et al. | 340/815.4 |
| 2003/0007261 A1 | * 1/2003 | Hutzel et al. | 359/838 |

OTHER PUBLICATIONS

"Bag of Tunes" brochure, Designs Enterprises, Inc.
Motorcycle Audio 1999 catalog, p. 23, Audiopak Pouch.

* cited by examiner

Primary Examiner—Forester W. Isen
Assistant Examiner—Elizabeth McChesney
(74) Attorney, Agent, or Firm—John M. Harrison

(57) ABSTRACT

A motorcycle audio system characterized by a housing for receiving a conventional or specially-designed radio, compact disc and/or tape player, CB radio or combination thereof, which housing is mounted to the windshield assembly of a motorcycle and includes an upwardly-oriented speaker on each end thereof. In a preferred embodiment, the housing is chrome-plated and, along with the speakers and the enclosed radio, compact disc player and/or tape player, CB radio or combination thereof, is easily viewed for safety and can be removed from the windshield assembly of the motorcycle and re-attached thereto, as desired, to facilitate maintenance work on, and/or cleaning of, the motorcycle. In some motorcycles, the windshield assembly can be conventionally removed from the motorcycle with the mounted audio system in place and unplugged, for cleaning and/or maintenance purposes. A conventional wedge-shaped storage pouch may be wedged between the windshield assembly and the housing for storing tapes, compact discs and like accessory items for operating and maintaining the motorcycle audio system.

14 Claims, 5 Drawing Sheets

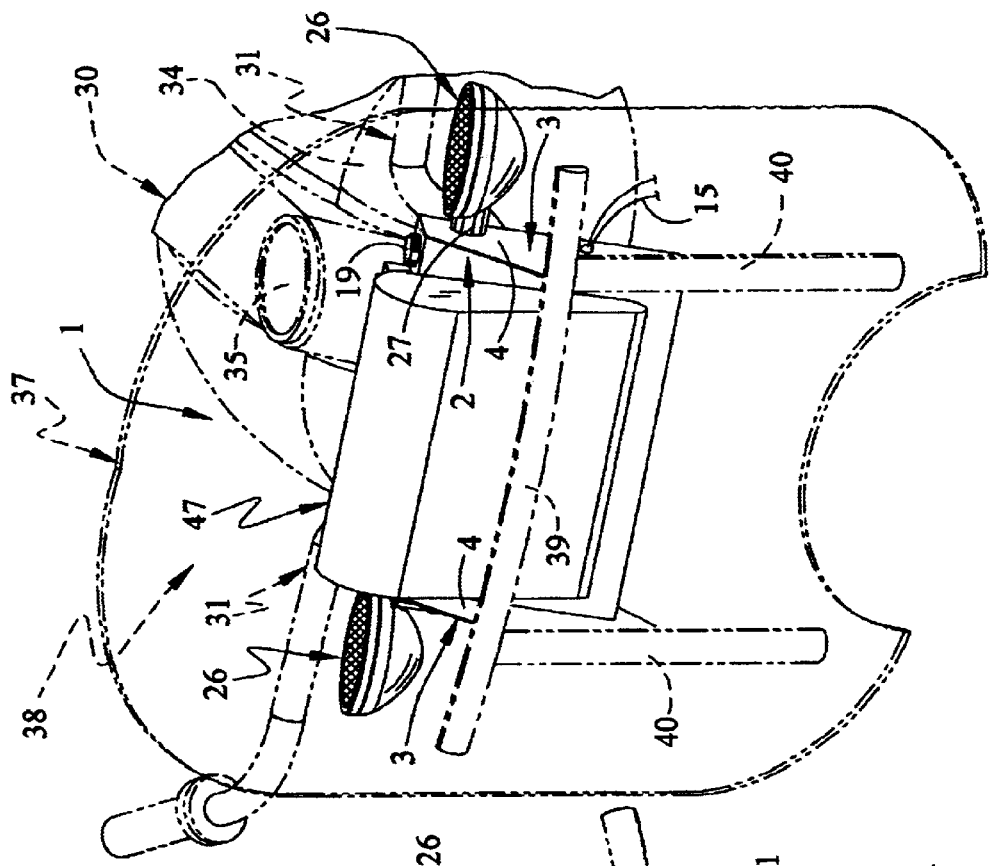
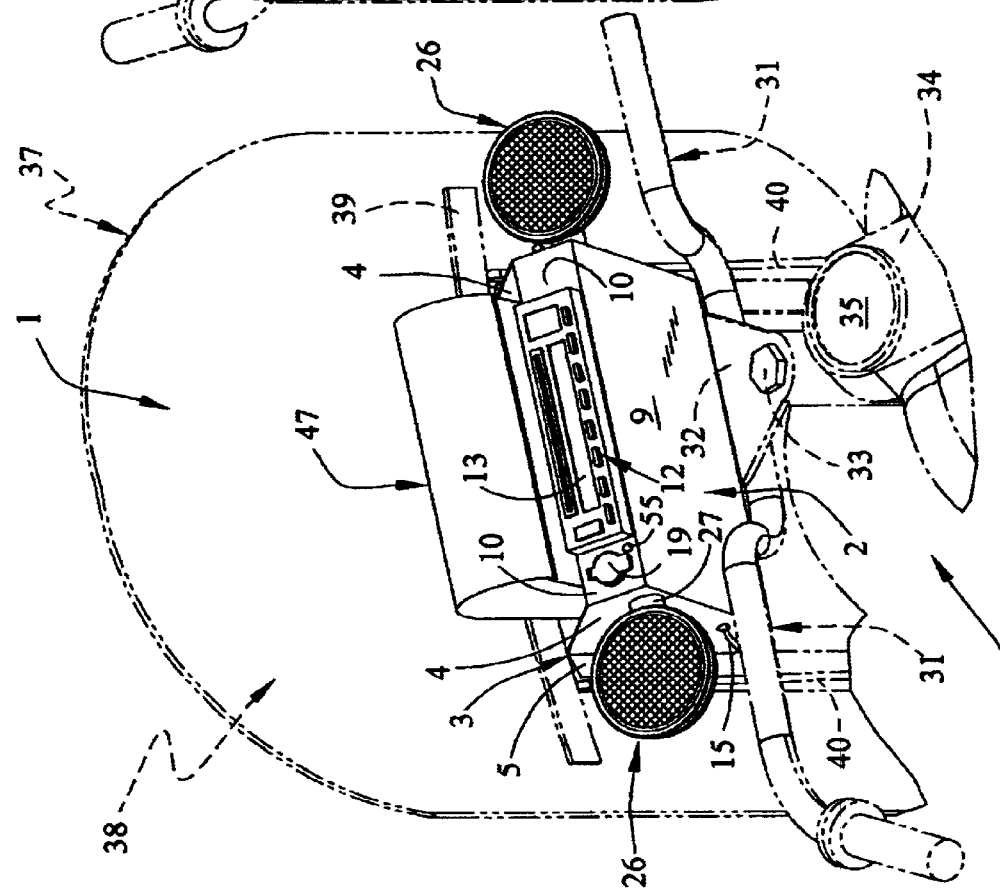
FIG. 1
FIG. 2

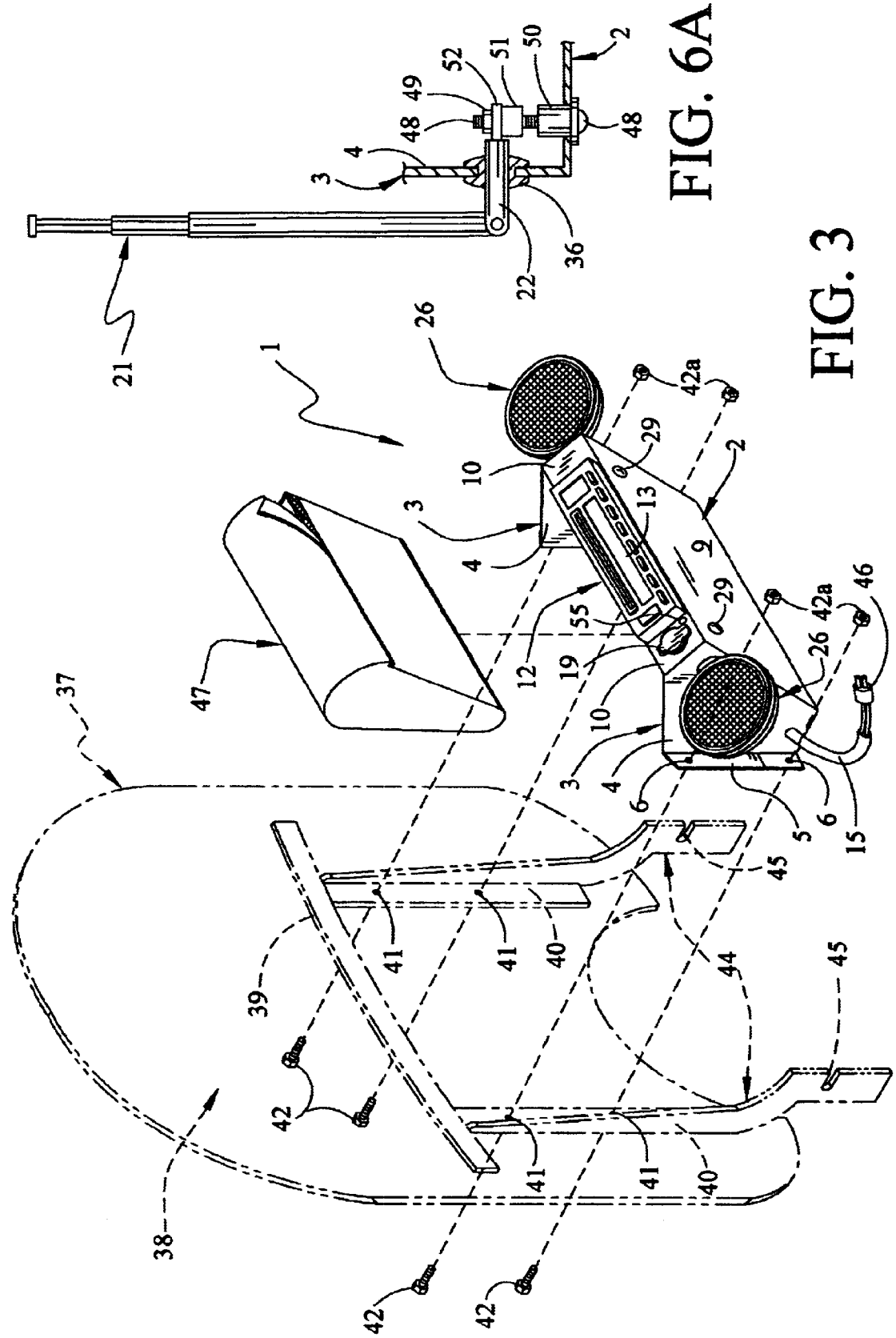

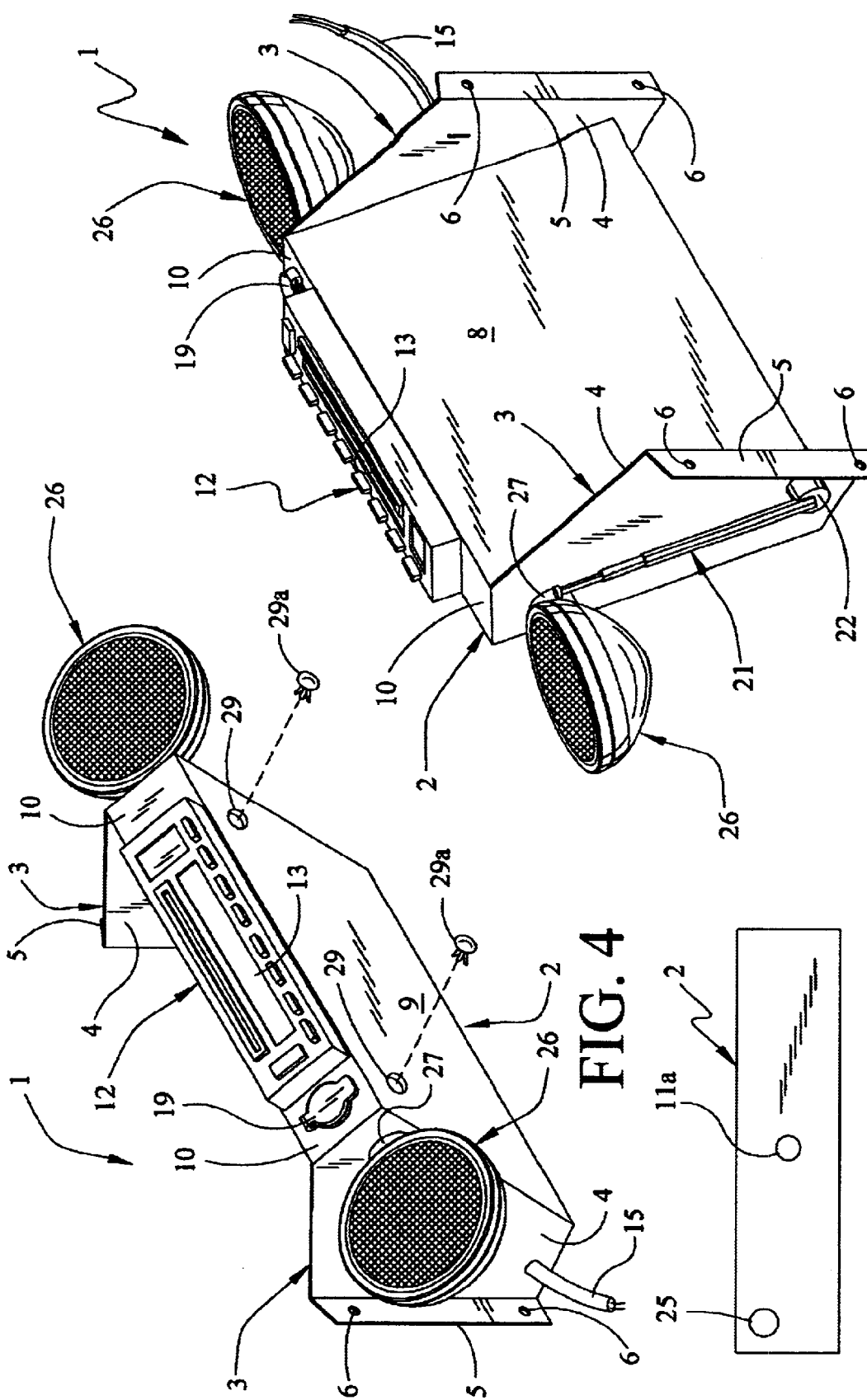

MOTORCYCLE AUDIO SYSTEM

CROSS-REFERENCE TO RELATED APPLICATIONS

This application claims the benefit of copending U.S. Provisional Application Serial No. 60/275,119, filed Mar. 13, 2001.

BACKGROUND OF THE INVENTION

1. Field of the Invention

This invention relates to audio systems for motorcycles of all types and more particularly, to a motorcycle audio system which is mounted on the windshield frame or assembly of a motorcycle, wherein the windshield assembly may be fixed or detachable from the motorcycle. The motorcycle audio system includes a typically chrome-plated housing which is sized to receive a conventional or specially-designed radio, compact disc player and/or tape player, CB radio or combination thereof, and fitted with a speaker on each end or on the bottom, such that the speakers are aligned substantially above or below the motorcycle handlebars and oriented toward a rider seated on the motorcycle. In a preferred embodiment, the motorcycle audio system is bolted or otherwise removably attached to a detachable windshield assembly using the windshield assembly bolts and nuts, such that the audio system can be unplugged from the power source and removed from or with the windshield assembly for maintenance work and/or cleaning of the motorcycle. In another embodiment, the motorcycle audio system can be attached to a fixed windshield assembly of any type or design of motorcycle, as desired, and the player element is easily viewed at a glance, for safety.

2. Description of the Prior Art

Various containers and container mount systems for accommodating motorcycle audio systems on motorcycles are known in the art. Examples include the container device detailed in U.S. Pat. No. 4,066,196, dated Jan. 3, 1978, to Jackson, et al. The Jackson, et al. patent details a "Handlebar Bag" which includes a box or container mounted at the handlebars of a bicycle by means of a wire frame, such that the container or box can be readily removed from the bicycle, as desired. U.S. Pat. No. 4,280,226, dated Jul. 21, 1981, to Joseph E. Jenkins, details a "Protective Cover For the Face Plate of a Motorcycle-Type Radio", wherein an open-face, rectangular cover box adapted for mounting on a motorcycle and receiving a motorcycle radio, has a wall that spans the face of the radio. A slot is provided in the wall to expose the rectangular station-selector window and the station selector shaft, volume shaft and on/off shaft of the radio. U.S. Pat. No. 4,445,228, dated Apr. 24, 1984, to James G. Bruni, details a "Motorcycle Audio System" which includes a pair of speakers mounted on the respective handlebars of a motorcycle and a power amplifier suspended by means of metal bars between the two speakers, in front of the motorcycle driver. U.S. Pat. No. 4,473,251, dated Sep. 25, 1984, to M. Murayama, describes a motorcycle equipped with audio equipment on the front cowl thereof, with audio speakers which are arranged to maintain balance and weight in the lateral direction of the motorcycle while maintaining easy operation of the audio components. U.S. Pat. No. 4,600,208, dated Jul. 15, 1986, to Morishima, details a pair of speakers arranged in a two-rider motorcycle having front and rear seats, which speakers are mounted on respective receptacles provided on the frame body at the back of the rear seat. U.S. Pat. No. 5,001,779, dated Mar. 19, 1991, to Eggert, et al., details a "Mounting Arrangement For Motorcycle Stereo System", which stereo system is mounted in a housing formed of a durable, flexible fabric that is removably attached to the gas tank of a motorcycle by magnets. U.S. Pat. No. 5,159,712, dated Oct. 27, 1992, to Schneider, et al., details a "Radio Integrated With Bicycle Handlebars", wherein a radio is mounted by means of straps to the handlebars of a bicycle. The accessory includes a housing for containing an audio system such as a radio, and a pair of straps attached to the front and rear of the housing are provided to hold the housing in wedging contact with the handlebars. U.S. Pat. No. 5,222,752, dated Jun. 29, 1993, to Hewitt, details a "Fairing and Utility Assembly For Bicycles", which assembly includes a car stereo-type audio source with speakers. A front fairing of the assembly, which houses the speakers, is mounted on the handlebars of a bicycle by means of straps. U.S. Pat. No. 5,732,965, dated Mar. 31, 1998, to B. A. Willey, details a "Mounting System For Motorcycle Accessories", which includes a latching mechanism attached to the motorcycle assembly member for attachment to a pair of lugs on the motorcycle frame and mounting and de-mounting the windshield accessory on and from the motorcycle. U.S. Pat. No. 5,881,936, dated Mar. 16, 1999, to Bernard A. Li, details a "Motorcycle Caddy" which is constructed of soft, compressible foam held between the handlebars and windshield of a motorcycle for receiving and holding objects therein for easy access by the rider during operation of the motorcycle.

It is an object of this invention to provide a new and improved motorcycle audio system for mounting on motorcycles, which audio system includes a housing for mounting on the fixed or removable windshield assembly of a motorcycle and receives a radio, compact disc and/or tape player, CB radio or combination thereof, and a pair of speakers attached to the housing, either above or below the handlebars of the motorcycle, depending upon the handlebar spacing.

Yet another object of this invention is to provide a new and improved motorcycle audio system which is designed for attachment to any type of motorcycle and is positioned above or below the motorcycle handlebars, centrally at the motorcycle windshield, and includes a preferably chrome plated metal, or a plastic or fiberglass housing for enclosing a radio, compact disc and/or tape player, CB radio or combination thereof, which housing is bolted or otherwise attached to the windshield frame or assembly of the motorcycle and includes a pair of speakers, one on each end or on the bottom of the housing, above or below the respective handlebars and oriented toward a rider on the motorcycle to facilitate superior acoustics and safe operation for the rider.

Still another object of the invention is to provide a new and improved motorcycle audio system for motorcycles, which system includes a housing for removably receiving a conventional or specially-designed radio, compact disc and/ or tape player, CB radio or combination thereof, which player is positioned for easy view for safety. The housing is typically bolted on the windshield assembly of a motorcycle using the windshield assembly mount bolts and nuts and can be unplugged from the power source and removed individually or in one piece with the windshield assembly.

A still further object of this invention is to provide a motorcycle audio system for bolting or mounting on the fixed or removable windshield frame or assembly of a motorcycle, which system includes a generally rectangularly-shaped, typically chrome-plated steel housing for removably receiving a conventional or specially-designed radio, compact disc and/or tape player, CB radio or combination thereof, with speakers provided on each end or on the bottom of the housing and located above or below the respective motorcycle handlebars, depending upon the handlebar spacing, and further including a specially mounted radio antenna and at least one accessory unit such as a power plug receptacle provided in the housing, which accessory unit is wired to receive an accessory plug for operating an accessory during operation of the motorcycle.

Still another object of this invention is to provide a motorcycle audio system for all types of motorcycles, which system can be fixed to or removably mounted on a typically removable windshield mount frame or assembly of the motorcycle, the system including a preferably chrome-plated steel housing, but also an optional plastic or fiberglass housing, secured to the windshield mount frame or assembly for containing a radio, compact disc player and/or tape player, CB radio or combination thereof, in easily viewable orientation, and a pair of spaced-apart speakers provided on each end or on the bottom of the housing and typically positioned above or below the respective handlebars and oriented toward the motorcycle driver, to facilitate superior acoustics and safety while the motorcycle is operated, including the use of headphones, as well as removal of the windshield frame or assembly and the motorcycle audio system together, to facilitate maintenance and/or cleaning of the motorcycle.

SUMMARY OF THE INVENTION

These and other objects of the invention are provided in a motorcycle audio system for removably mounting on the windshield frame or windshield mount bars of a windshield assembly of a motorcycle of any design, and typically a design wherein the windshield assembly may be conventionally removable from the motorcycle, which system includes a generally rectangular, chrome-plated housing having a hollow interior for receiving a typically conventional, or a specially-designed radio, compact disc player and/or tape player, CB radio or combination thereof, the housing further fitted with a wiring harness plug, accessory and head phone jacks and a pair of speakers spaced-apart on each end or on the bottom thereof, which speakers are typically positioned above or below the handlebars of the motorcycle, depending upon the handlebar spacing, and oriented toward a rider seated on the motorcycle. The motorcycle audio system can be easily viewed without rider movement and it can be operated and removed from the windshield mount bars of the windshield assembly, or in some designs, the entire windshield assembly with the audio system mounted thereon can be removed from the motorcycle in conventional fashion, as desired by unplugging the wiring harness plug from the power source receptacle, to facilitate maintenance and/or cleaning of the motorcycle.

BRIEF DESCRIPTION OF THE DRAWINGS

The invention will be better understood by reference to the accompanying drawings, wherein:

FIG. 1 is a front perspective, or rider's, view of the motorcycle audio system of this invention, mounted on the windshield frame or assembly of a motorcycle;

FIG. 2 is a rear perspective view of the motorcycle audio system and front view of the windshield illustrated in FIG. 1;

FIG. 3 is an exploded, perspective view of the motorcycle audio system and the windshield and windshield frame or assembly illustrated in FIG. 1;

FIG. 4 is a front perspective view of the assembled motorcycle audio system housing and speakers illustrated in FIG. 1, removed from the windshield assembly of the motorcycle;

FIG. 4A is a rear elevational view of the motorcycle audio system housing;

FIG. 5 is a rear perspective view of the motorcycle audio system housing and speakers illustrated in FIG. 4;

FIG. 6A is a sectional view of a preferred radio antenna mount configuration.

DESCRIPTION OF THE PREFERRED EMBODIMENTS

Figure 6:
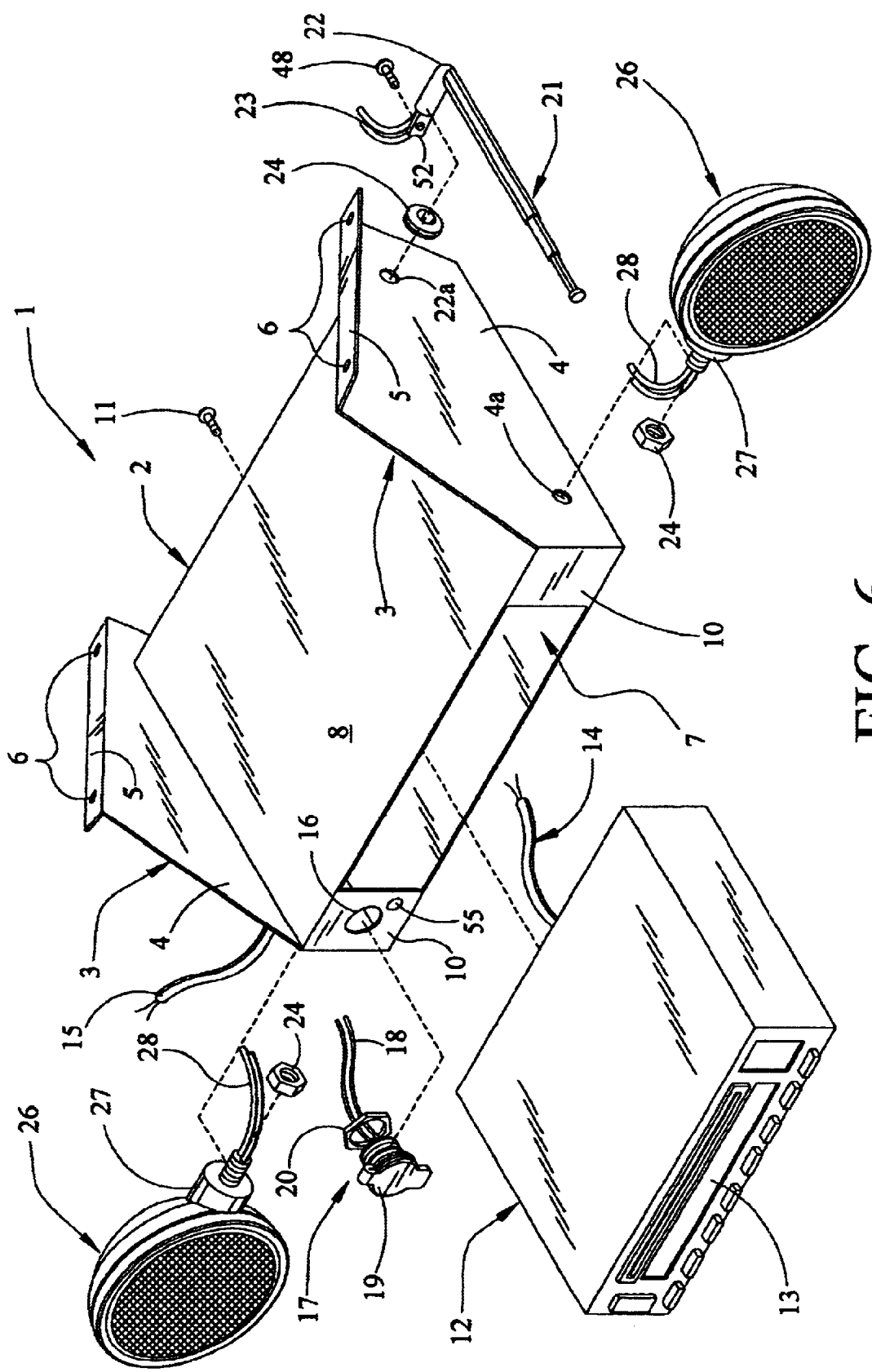
FIG. 6 is an exploded, perspective view of the motorcycle audio system illustrated in FIGS. 5 and 6, more particularly illustrating a preferred mounting of the speakers and radio antenna on the housing and insertion of the radio, compact disc player and/or tape player, CB radio or combination thereof in the housing.
Figure 7:
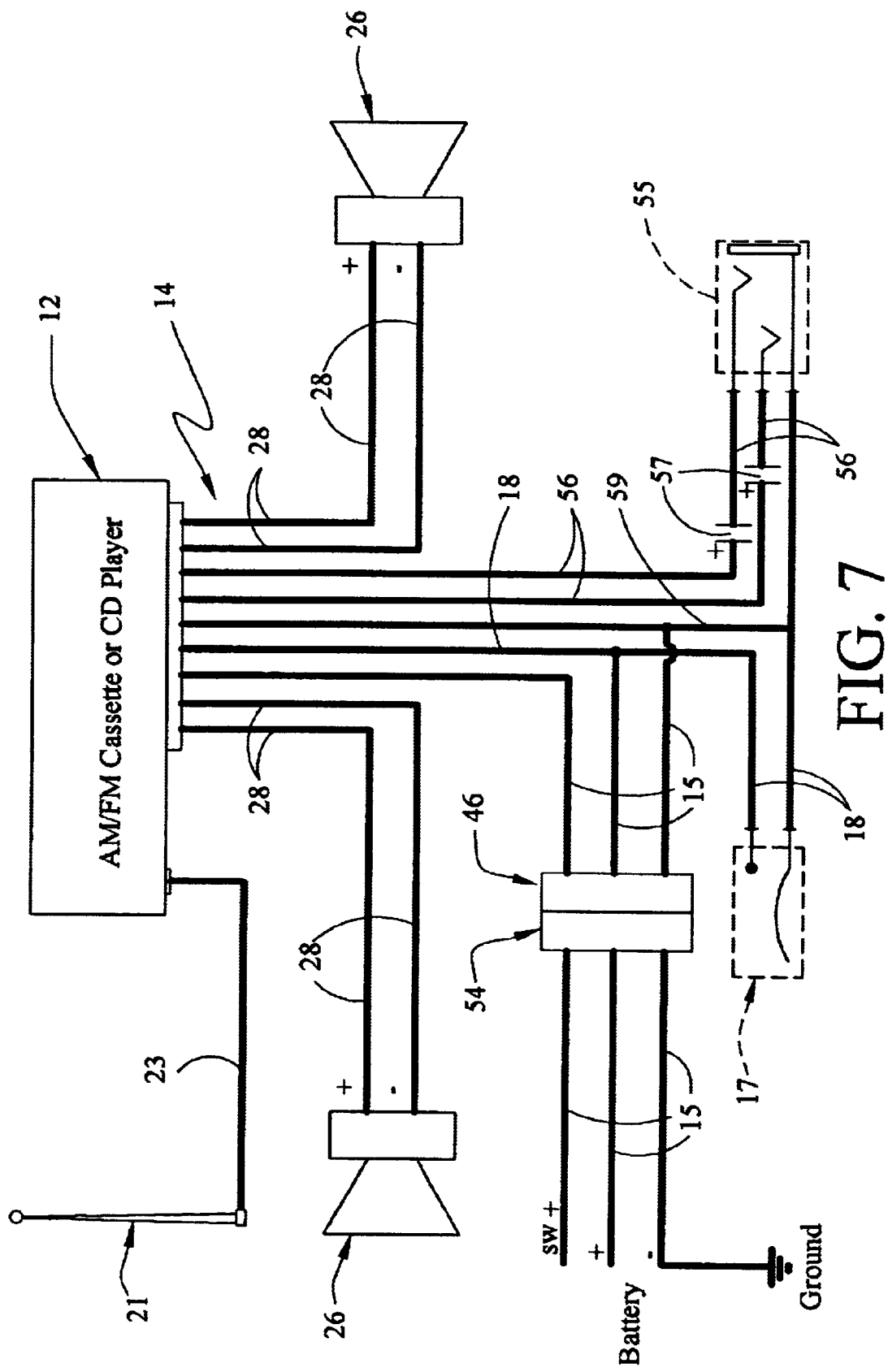
FIG. 7 is a schematic illustrating a preferred wiring of the motorcycle audio system illustrated in FIGS. 1–6.

Referring initially to FIGS. 1–4, 6 and 7 of the drawings, the motorcycle audio system of this invention is generally illustrated by reference numeral 1. The motorcycle audio system 1 is characterized by a housing 2, which is capable of enclosing a conventional or a specially-designed radio, compact disc and/or tape player, CB radio or combination thereof (hereinafter "player 12"), in the housing opening 7 (FIG. 6) of a front panel 10 of the housing 2, as desired. The housing 2 further includes a housing top 8 and a housing bottom 9, as illustrated in FIGS. 3 and 4 of the drawings. The player 12 is typically characterized by a player receptacle or slot 13 for receiving tapes and/or compact discs (not illustrated), depending upon the nature of the player 12, and player wiring 14 (FIG. 6) extends from the back of the player 12 for connection to a power source and operation, typically as illustrated in FIG. 7. The housing 2 includes a pair of housing mount brackets 3, typically welded or bolted to the housing 2, or fashioned in one piece with the housing 2. Furthermore, each housing mount bracket 3 is characterized by a mount bracket plate 4, with speaker mount openings 4a provided on both sides of the mount bracket plate 4, and an antenna mount opening 22a, on the right hand side of the right-hand mount bracket plate 4, as illustrated in FIG. 6. The mount bracket plates 4 are each terminated by an outwardly-turned mount bracket flange 5, each having a pair of spaced-apart flange openings 6, for attaching the housing 2 to the motorcycle windshield assembly 37 of a motorcycle 30 (FIG. 3), as hereinafter further described. As further illustrated in FIGS. 3, 6 and 7, a wiring harness 15, having a wiring harness plug 46 (FIG. 3), extends from the left side of the housing 2 and connects to the player wiring 14, typically as illustrated in FIG. 7, for operating the player 12 according to the knowledge of those skilled in the art. An optional power plug opening 16 and headphone receptacle 55 are further provided in the front panel 10 of the housing 2, and the power plug opening 16 receives a power plug receptacle or jack 17, having receptacle wiring 18 for wiring into the wiring harness 15, further as typically illustrated in FIG. 7, with a receptacle closure 19 closing the power plug receptacle 17. A mount nut or ring 20 is typically provided in the power plug receptacle 17 for securing the power plug receptacle 17 in the power plug opening 16 of the housing 2, in conventional fashion. A headphone plug (not illustrated) may be inserted in the headphone receptacle 55, also illustrated in phantom in FIG. 7, which is wired into the player 12 by headphone wiring 56, using capacitors 57.

A radio antenna 21 is also typically attached to one of the housing mount brackets 3, as further illustrated in FIGS. 6 and 6A, and includes an antenna mount 22, complete with antenna wiring 23 (FIG. 6) which is wired into a separate wiring harness, typically as illustrated in FIG. 7, to operate the radio element of the player 12 using the extended radio antenna 21. A nut 49 and antenna mount bolt 48 serve to secure the antenna mount 22 of the radio antenna 21 in a rubber grommet 36, positioned as illustrated in FIG. 6A on the right-hand side of the right-hand mount bracket plate 4 of the housing mount bracket 3 inside the housing 2, at the antenna mount opening 22a. In a preferred configuration the antenna mount bolt 48 extends through the antenna bolt access opening 25 (FIG. 4A) and seats in a shoulder washer 50. A spacer 51 is provided on the antenna mount bolt 48 and the antenna mount bolt 48 extends through an antenna flange 52, extending from the antenna mount 22, to receive the nut 49. In this mounting configuration there is no grounding of the radio antenna 21 on the housing 2.

As illustrated in FIGS. 1–7 of the drawings, each of a pair of speakers 26 is fitted with a threaded speaker mount 27 and speaker wiring 28 (FIG. 6), the latter of which is attached to the player wiring 14 typically as illustrated in FIG. 7, for operating the speakers 26 when the player 12 is activated. Each of the speakers 26 is attached to a corresponding one of the housing mount brackets 3 by seating the corresponding threaded element of the speaker mount 27 in the speaker mount openings 4a and securing it in place with a mount nut 24, as further illustrated in FIG. 6. Alternatively, the speakers 26 can be attached to the bottom of the housing 2 at the optional speaker mount openings 29 (FIGS. 3 & 4), normally closed by removable caps 29a (FIG. 4), depending upon the spacing and oriented of the handlebars 31 of the motorcycle 30.

Referring again to FIGS. 1–3 and 6 of the drawings, it will be appreciated by those skilled in the art that in a preferred embodiment of the invention, the housing 2 of the motorcycle audio system 1 can be typically attached to a pair of vertical windshield mount bars 40 in a windshield assembly 37 of the motorcycle 30, which windshield assembly 37 typically includes a horizontal windshield mount bar 39 spanning the spaced-apart, vertical windshield mount bars 40. A plexiglass windshield 38 is attached to the horizontal windshield mount bar 39 and the vertical windshield mount bars 40 in conventional fashion, and the housing 2 is typically secured to the vertical windshield mount bars 40 by means of windshield mount bolts 42 (FIG. 3) that extend through mount bar openings 41 in the corresponding spaced-apart windshield mount bars 40 and aligned openings (not illustrated) in the windshield 38, to receive the corresponding windshield mount nuts 42a. The respective flange openings 6 of the mount bracket flanges 5 in the respective mount bracket plates 4 align with the corresponding windshield mount bolts 42, as further illustrated in FIG. 3.

It will be appreciated by those skilled in the art that the housing 2 encloses and secures the player 12 therein by means of a player mount bolt 11, engaging the player 12, through a player mount bolt opening 11a as illustrated in FIG. 4A and FIG. 6. The housing 2 receives the mounted speakers 26 and the radio antenna 21 (FIG. 6), can be easily attached to and removed from the windshield assembly 37 by inserting and removing the respective windshield mount bolts 42 and corresponding windshield mount nuts 42a, respectively, as further illustrated in FIG. 3.

Referring again to FIGS. 1 and 3 of the drawings, in certain motorcycle designs, each vertical windshield mount bar 40 of the windshield assembly 37 is fitted with a conventional, downwardly-extending mount strut 44, having a strut slot 45 in the bottom portion thereof, which strut slots 45 are designed to receive conventional structural members (not illustrated) provided on the motorcycle frame (not illustrated) of the motorcycle 30 (FIG. 1) for removably attaching the windshield assembly 37 to the motorcycle 30, according to the knowledge of those skilled in the art. Accordingly, the housing 2 is preferably bolted to the respective vertical windshield mount bars 40 using the windshield mount bolts 42 and the windshield mount nuts 42a, as illustrated in FIG. 3 and the entire windshield assembly 37, having the motorcycle audio system 1 mounted thereon, can be quickly and easily removed from the motorcycle 30, as well as the player 12 and the attached speakers 26 and the radio antenna 21, after unplugging the single wiring harness plug 46 from a power plug 54, illustrated in FIG. 7 and extending from a battery (not illustrated) on the motorcycle 30. This removable arrangement in mounting of the entire windshield assembly 37 facilitates maintenance and/or cleaning of the motorcycle 30 without detachment of the motorcycle audio system 1, in an optimum manner.

It will be further appreciated by those skilled in the art from a consideration of FIG. 1 of the drawings, that the housing 2 and the speakers 26 of the motorcycle audio system 1 are typically located above the handlebars 31 and the speakers 26 are oriented upwardly toward a rider (not illustrated) seated on the motorcycle 30 to facilitate optimum acoustical characteristics behind the windshield 38, when the spacing of the handlebars 31 allows such a speaker configuration. Alternatively, as heretofore described, in the case of narrow handlebars 31 and limited space above the handlebars 31, the speakers 26 can be secured to the bottom of the housing 2, at the optional speaker mount openings 29, illustrated in FIGS. 3 and 4 of the drawings, as heretofore described. As in the case of conventional motorcycles, the handlebars 31 of the motorcycle 30 are typically secured to a conventional steering plate 32, located forwardly of the gas tank 34 and the speedometer 35 (FIG. 1). The steering plate 32 is also typically attached to the front fork (not illustrated) of the motorcycle 30 by means of a steering plate bolt 33, which facilitates steering of the motorcycle in conventional fashion.

As further illustrated in FIGS. 1–3 of the drawings, a storage pouch or container 47, for containing tapes, compact discs and other accessories may be provided adjacent to the housing 2 and may be mounted to the housing top 8 (FIG. 5) of the housing 2 in any conventional manner, or unmounted, according to the knowledge of those skilled in the art. As illustrated in FIG. 3, the storage pouch 47 is preferably wedged-shaped in order to fit between the windshield 38 and the adjacent housing 2 of the motorcycle audio system 1 and may typically be fitted with a loop-pile closure 53.

It will be further appreciated from a consideration of the drawings that the motorcycle audio system 1 of this invention is characterized by safety, convenience, flexibility and optimum performance, not only under circumstances where the motorcycle 30 is operating, but also when it is desired to maintain the motorcycle 30 or clean it. In the latter case, the entire windshield assembly 37 can be removed from the motorcycle after simply unplugging the wiring harness plug 46 from the power plug 54 (FIG. 7), as heretofore described, or the motorcycle audio system 1, including the housing 2, speakers 26, radio antenna 21 and player 12 can be quickly and easily removed from the windshield assembly 37 as a single unit, by removing the four mount bolts 42 and corresponding windshield mount nuts 42a as illustrated in FIG. 3. Furthermore, the addition of the motorcycle audio system 1 to the removable, breakaway windshield assembly 37 does not impede the breakaway feature in the event of an accident involving the motorcycle.

The motorcycle audio system 1 is further characterized by convenience and flexibility, in that the player 12 may include a conventional or specially-designed radio, a combination radio and compact disc player, or a combination radio, compact disc player and tape player, CB radio and the like, according to the knowledge of those skilled in the art. Furthermore, referring again to FIG. 1 of the drawings a primary safety feature is facilitated, in that the player 12 is easily viewed by the motorcycle operator at a glance, without the necessity of shifting the operator's position on the motorcycle. Moreover, as further illustrated in FIG. 6 of the drawings, the radio antenna 21 is ideally located on one of the housing mount brackets 3 for raising and lowering in order to operate the player 12 as a radio, as desired. Power from a battery provided on the motorcycle 30 is typically supplied through a switch to the player 12 through the power wiring harness 15, as illustrated in FIG. 7. Power is supplied directly from the battery to the optional power plug receptacle 17 and the memory circuits of the player 12, through the receptacle wiring 18. The player 12 connects to the speakers 26 through the speaker wiring 28; the radio antenna 21, through the antenna wiring 23; and the headphone receptacle 55, through the headphone wiring 56, and the ground circuit 59, respectively. The capacitors 57 allow a common ground headset or headphone (not illustrated) to be plugged into the headphone and be used with the floating ground stereo speaker output.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A motorcycle audio system for mounting an audio player on a motorcycle having a windshield assembly, said motorcycle audio system comprising:

a housing for receiving the audio player, said housing having a pair of spaced-apart housing mount brackets and a mount bracket flange provided on each of said housing mount brackets for mounting said housing on the windshield assembly of the motorcycle; and at least one speaker provided on said housing.

2. The motorcycle audio system of claim 1 wherein said at least one speaker comprises a pair of speakers.

3. The motorcycle audio system of claim 1 comprising a storage pouch provided on said housing between said housing and the windshield assembly of the motorcycle.

4. The motorcycle audio system of claim 3 wherein said at least one speaker comprises a pair of speakers.

5. A motorcycle audio system for mounting an audio player on a removable windshield assembly of a motorcycle, said motorcycle audio system comprising:

a housing for mounting on said windshield assembly and receiving the audio player; and a radio antenna attached to said housing; and a pair of spaced-apart speakers provided on said housing.

6. The motorcycle audio system of claim 5 comprising a pair of housing mount brackets provided on said housing for mounting said housing on said windshield assembly.

7. The motorcycle audio system of claim 5 wherein said a pair of speakers is mounted on the ends of said housing.

8. The motorcycle audio system of claim 7 comprising a pair of housing mount brackets provided on said housing for mounting said housing on said vertical windshield mount bars, respectively, of said windshield assembly.

9. The motorcycle audio system of claim 5 wherein said pair of speakers is mounted on the bottom of said housing.

10. The motorcycle audio system of claim 9 comprising a pair of housing mount brackets provided on said housing for mounting said housing on said vertical windshield mount bars, respectively, of said windshield assembly.

11. A motorcycle audio system for mounting an audio player on a removable windshield assembly of a motorcycle, said motorcycle audio system comprising:

a housing for receiving the audio player;

a pair of housing mount brackets provided on said housing for mounting said housing on said removable windshield assembly;

a radio antenna attached to said housing;

speaker mount openings provided in said housing; and a pair of speakers provided on said housing at said speaker mount openings.

12. The motorcycle audio system of claim 11 comprising a power plug receptacle provided in said housing for receiving an auxiliary power plug.

13. The motorcycle audio system of claim 11 comprising a headphone receptacle provided in said housing for receiving a headphone plug.

14. The motorcycle audio system of claim 11 comprising:

(a) a power plug receptacle provided in said housing for receiving an auxiliary power plug; and (b) a headphone receptacle provided in said housing for receiving a headphone plug.

* * * * *